(12) United States Patent
Hayashi et al.

(10) Patent No.: US 11,971,112 B1
(45) Date of Patent: Apr. 30, 2024

(54) ELECTROMAGNETIC VALVE MANIFOLD

(71) Applicant: CKD CORPORATION, Komaki (JP)

(72) Inventors: Atsuo Hayashi, Komaki (JP); Hisashi Hatano, Komaki (JP); Mitsuhiro Kosugi, Komaki (JP); Shinji Itoh, Komaki (JP)

(73) Assignee: CKD CORPORATION, Aichi (JP)

( * ) Notice: Subject to any disclaimer, the term of this patent is extended or adjusted under 35 U.S.C. 154(b) by 0 days.

(21) Appl. No.: 18/307,156

(22) Filed: Apr. 26, 2023

(51) Int. Cl.
| | | |
|---|---|---|
| *F16K 27/04* | (2006.01) | |
| *F16K 11/07* | (2006.01) | |
| *F16K 15/02* | (2006.01) | |
| *F16K 15/18* | (2006.01) | |
| *F16K 27/02* | (2006.01) | |

(52) U.S. Cl.
CPC .......... *F16K 27/0209* (2013.01); *F16K 11/07* (2013.01); *F16K 15/028* (2013.01); *F16K 15/184* (2021.08); *F16K 27/041* (2013.01); *F16K 27/048* (2013.01)

(58) Field of Classification Search
CPC .... F16K 27/0209; F16K 11/07; F16K 27/048; F16K 2200/50
See application file for complete search history.

(56) References Cited

U.S. PATENT DOCUMENTS

2014/0166138 A1* 6/2014 Bisig .................. B23P 11/00
29/890.12

FOREIGN PATENT DOCUMENTS

| JP | H11-280927 A | | 10/1999 |
|---|---|---|---|
| JP | 2001173831 A | * | 6/2001 |

OTHER PUBLICATIONS

Translation of JP2001173831 (Year: 2023).*

* cited by examiner

*Primary Examiner* — Kelsey E Cary
(74) *Attorney, Agent, or Firm* — TAROLLI, SUNDHEIM, COVELL & TUMMINO L.L.P.

(57) ABSTRACT

An electromagnetic valve manifold includes an electromagnetic valve including a discharge port, a manifold base including a discharge passage that is connected to the discharge port, and a check valve. The check valve includes a valve member, a valve housing including a valve seat, and an urging member. The valve housing includes a valve chamber that accommodates the valve member, a peripheral wall that defines the valve chamber, a valve hole that connects the valve chamber to the discharge port, and a discharge opening that connects the valve chamber to the discharge passage. The check valve is disposed in the discharge passage. The discharge opening is formed in the peripheral wall, at least a part of the discharge opening overlapping with the valve seat in a direction orthogonal to a moving direction of the valve member.

6 Claims, 5 Drawing Sheets

ELECTROMAGNETIC VALVE MANIFOLD

BACKGROUND

1. Field

The present disclosure relates to an electromagnetic valve manifold.

2. Description of Related Art

An electromagnetic valve manifold includes an electromagnetic valve and a manifold base. The electromagnetic valve includes a discharge port. The manifold base includes a placement surface on which the electromagnetic valve is placed. The manifold base includes a discharge passage. The discharge passage opens in the placement surface and is connected to the discharge port.

Some electromagnetic valve manifolds include a check valve, for example, as disclosed in Japanese Laid-Open Patent Publication No. H11-280927. The check valve includes a valve member, a valve housing, and an urging member. The valve housing includes a valve seat, a valve chamber, a peripheral wall, a valve hole, and a discharge opening. The valve chamber accommodates the valve member. The peripheral wall is tubular and defines the valve chamber. The valve hole connects the valve chamber to the discharge port. The discharge opening connects the valve chamber to the discharge passage. The valve seat is part of the valve housing and is an annular portion around an opening of the valve hole that opens to the valve chamber. The valve seat projects into the valve chamber. The valve member is seated on the valve seat. The urging member urges the valve member toward the valve seat. The valve member reciprocates in an axial direction of the peripheral wall in the valve chamber to be brought into contact with and separated from the valve seat. The check valve permits fluid to flow from the discharge port to the discharge passage and prevents fluid from flowing from the discharge passage to the discharge port. This prevents the electromagnetic valve from malfunctioning due to backflow of fluid from the discharge passage to the discharge port.

The check valve disclosed in the above publication is disposed inside the discharge port. When the valve member is separated from the valve seat, the fluid flowing out from the discharge port to the valve chamber via the valve hole passes through the gap between the valve member and the peripheral wall and reaches the discharge opening. Thereafter, the fluid is discharged to the discharge passage via the discharge opening. In such a case, if the cross-sectional flow area of the gap between the valve member and the peripheral wall is not sufficient, the fluid is not smoothly discharged from the discharge port to the discharge passage, which increases the pressure loss of the fluid. On the other hand, if the size of the valve member is reduced in order to maximize the cross-sectional flow area of the gap between the valve member and the peripheral wall, the diameter of the valve seat is also reduced in accordance with the size of the valve member. Accordingly, the cross-sectional flow area of the valve hole is reduced. The fluid is thus not smoothly discharged from the discharge port to the discharge passage, which increases the pressure loss of the fluid.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electromagnetic valve manifold includes an electromagnetic valve including a discharge port, a manifold base including a placement surface on which the electromagnetic valve is placed and a discharge passage that is open in the placement surface and is connected to the discharge port, and a check valve that permits fluid to flow from the discharge port to the discharge passage and prevents fluid from flowing from the discharge passage to the discharge port. The check valve includes a valve member, a valve housing including a valve seat on which the valve member is seated, and an urging member that urges the valve member toward the valve seat. The valve housing includes a valve chamber that accommodates the valve member, a peripheral wall that defines the valve chamber, a valve hole that connects the valve chamber to the discharge port, and a discharge opening that connects the valve chamber to the discharge passage. The valve seat is part of the valve housing and is an annular portion around an opening of the valve hole that opens to the valve chamber. The valve seat protrudes into the valve chamber. The valve member is configured to move toward and away from the valve seat by reciprocating in the valve chamber in an axial direction of the peripheral wall. The check valve is disposed in the discharge passage. The discharge opening is formed in the peripheral wall. At least a part of the discharge opening overlaps with the valve seat in a direction orthogonal to a moving direction of the valve member.

In another general aspect, an electromagnetic valve manifold includes an electromagnetic valve including a discharge port, a manifold base including a placement surface on which the electromagnetic valve is placed and a discharge passage that is open in the placement surface and is connected to the discharge port, and a check valve that permits fluid to flow from the discharge port to the discharge passage and prevents fluid from flowing from the discharge passage to the discharge port. The check valve includes a valve member, a valve housing including a valve seat on which the valve member is seated, and an urging member that urges the valve member toward the valve seat. The valve housing includes a valve chamber that accommodates the valve member, a peripheral wall that defines the valve chamber, a valve hole that connects the valve chamber to the discharge port, and a discharge opening that connects the valve chamber to the discharge passage. The valve seat is part of the valve housing and is an annular portion around an opening of the valve hole that opens to the valve chamber. The valve member is configured to move toward and away from the valve seat by reciprocating in the valve chamber in an axial direction of the peripheral wall. The check valve is disposed in the discharge passage. The discharge opening is formed in the peripheral wall and is provided, in the moving direction of the valve member, over at least a moving range of a surface of the valve member in contact with the valve seat.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An electromagnetic valve manifold according to one embodiment will now be described with reference to FIGS. 1 to 8.

<Electromagnetic Valve Manifold 10>

Figure 1:
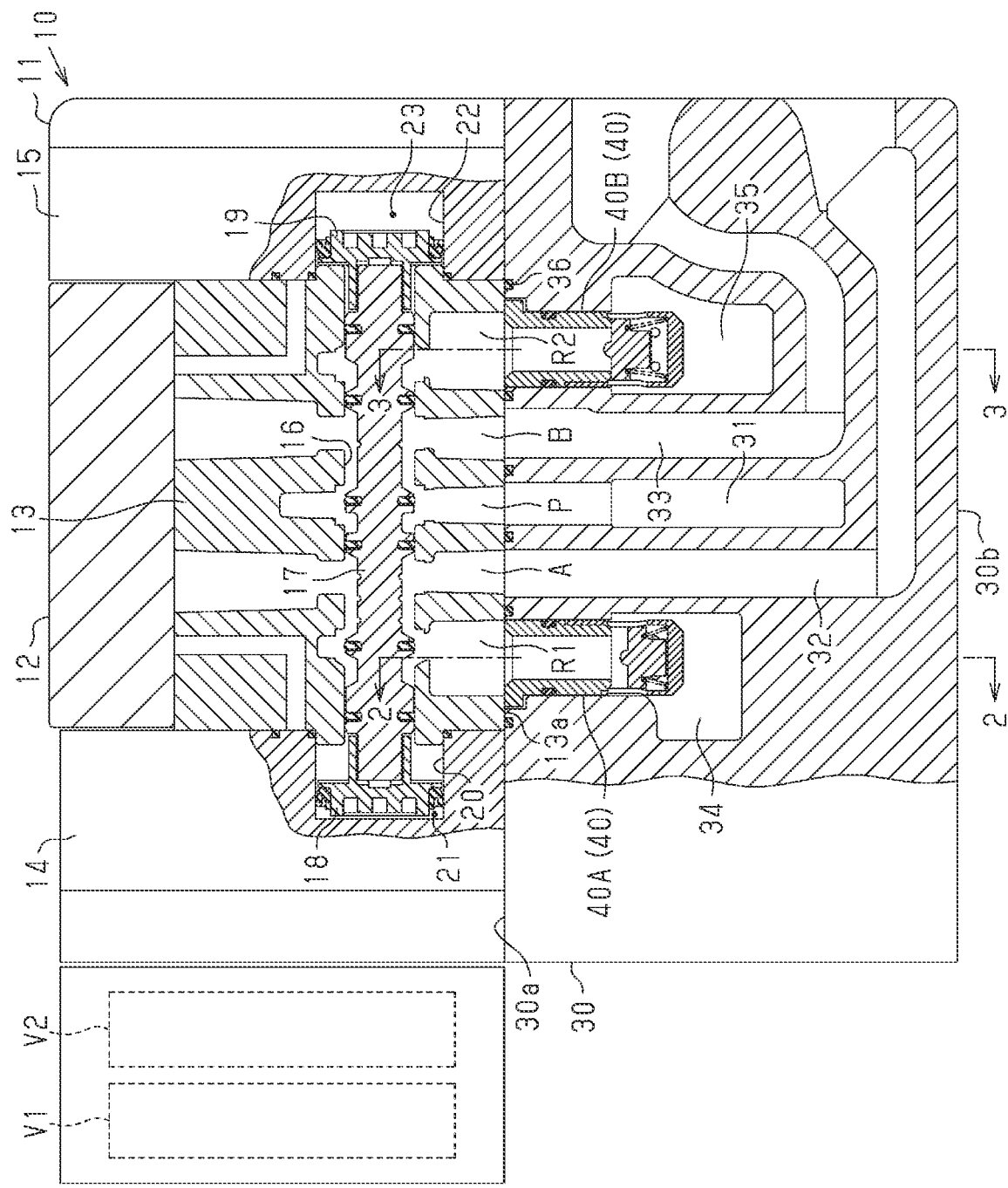
FIG. 1 is a cross-sectional view of an electromagnetic valve manifold according to one embodiment.

As shown in FIG. 1, an electromagnetic valve manifold 10 includes one or more electromagnetic valves 11 and one or more manifold bases 30. FIG. 1 illustrates one electromagnetic valve 11 and one manifold base 30. For example, the electromagnetic valves 11 are arranged in a row. The manifold bases 30 are arranged side by side in the arrangement direction of the electromagnetic valves 11 arranged in a row in correspondence with the electromagnetic valves 11. Accordingly, the arrangement direction of the manifold bases 30 agrees with the arrangement direction of the electromagnetic valves 11.

<Electromagnetic Valves 11>

Each electromagnetic valve 11 includes a valve casing 12. The valve casing 12 has the shape of an elongated rectangular block. The valve casing 12 includes a valve body 13, a first coupling block 14, and a second coupling block 15. The valve body 13 has the shape of an elongated rectangular block. The first coupling block 14 is coupled to a first end in the longitudinal direction of the valve body 13. The second coupling block 15 is coupled to a second end in the longitudinal direction of the valve body 13. The valve body 13 includes a body facing surface 13a, which faces the manifold base 30.

<Spool Valve Hole 16>

The valve casing 12 includes a spool valve hole 16. The spool valve hole 16 is formed in the valve body 13. The spool valve hole 16 is a circular hole. The spool valve hole 16 extends in the longitudinal direction of the valve body 13.

A first end of the spool valve hole 16 opens in a first end face in the longitudinal direction of the valve body 13. A second end of the spool valve hole 16 opens in a second end face in the longitudinal direction of the valve body 13. Thus, the spool valve hole 16 extends through the valve body 13 in the longitudinal direction.

<Spool Valve 17>

Each electromagnetic valve 11 includes a spool valve 17. The spool valve 17 is accommodated in the spool valve hole 16. The spool valve 17 is accommodated in the spool valve hole 16 with the axial direction of the spool valve 17 agreeing with the axial direction of the spool valve hole 16. The spool valve 17 is allowed to reciprocate in the spool valve hole 16.

<Ports of Electromagnetic Valve 11>

Each electromagnetic valve 11 includes a supply port P, a first output port A, a second output port B, a first discharge port R1, and a second discharge port R2. The electromagnetic valve 11 of the present embodiment is thus a five-port electromagnetic valve. The first discharge port R1 and the second discharge port R2 are discharge ports of the electromagnetic valve 11. The electromagnetic valve 11 thus includes two discharge ports.

The supply port P, the first output port A, the second output port B, the first discharge port R1, and the second discharge port R2 are formed in the valve body 13. The supply port P, the first output port A, the second output port B, the first discharge port R1, and the second discharge port R2 are each connected to the spool valve hole 16.

The first discharge port R1, the first output port A, the supply port P, the second output port B, and the second discharge port R2 are arranged in that order from the first end to the second end in the longitudinal direction of the valve body 13. The supply port P, the first output port A, the second output port B, the first discharge port R1, and the second discharge port R2 each include a first end portion connected to the spool valve hole 16. The supply port P, the first output port A, the second output port B, the first discharge port R1, and the second discharge port R2 each include a second end portion, which opens in the body facing surface 13a of the valve body 13.

<First Piston 18 and Second Piston 19>

Each electromagnetic valve 11 includes a first piston 18 and a second piston 19. The first piston 18 has the shape of a disc. The first piston 18 is coupled to a first end of the spool valve 17. The first piston 18 moves integrally with the spool valve 17. The second piston 19 has the shape of a disc. The second piston 19 is coupled to a second end of the spool valve 17. The second piston 19 moves integrally with the spool valve 17.

<First Pilot Pressure Chamber 21>

The first coupling block 14 includes a first piston accommodating recess 20, which is a circular hole. The first piston accommodating recess 20 accommodates the first piston 18, while allowing the first piston 18 to reciprocate. The first piston accommodating recess 20 and the first piston 18 define a first pilot pressure chamber 21. Pilot fluid is supplied to and discharged from the first pilot pressure chamber 21.

<Second Pilot Pressure Chamber 23>

The second coupling block 15 includes a second piston accommodating recess 22, which is a circular hole. The second piston accommodating recess 22 accommodates the second piston 19, while allowing the second piston 19 to reciprocate. The second piston accommodating recess 22 and the second piston 19 define a second pilot pressure chamber 23. Pilot fluid is supplied to and discharged from the second pilot pressure chamber 23.

<First Pilot Valve V1 and Second Pilot Valve V2>

Each electromagnetic valve 11 includes a first pilot valve V1 and a second pilot valve V2. The electromagnetic valve 11 is therefore a double-solenoid electromagnetic pilot valve. Application of voltage to the first pilot valve V1 and the second pilot valve V2 is performed, for example, by an external controller (not shown) such as a programmable logic controller (PLC).

<First Position and Second Position of Spool Valve 17>

The spool valve 17 is selectively switchable between a first position and a second position. For example, there may be a case in which voltage is applied to the first pilot valve V1, and voltage is not applied to the second pilot valve V2. In this case, the first pilot valve V1 supplies compressed fluid, which is pilot fluid, from a fluid supply source (not shown) to the first pilot pressure chamber 21. The second pilot valve V2 discharges the pilot fluid in the second pilot pressure chamber 23 to the atmosphere. Accordingly, the spool valve 17 moves toward the second piston accommodating recess 22. As a result, the spool valve 17 is switched to the first position, in which the supply port P is connected to the first output port A, and the second output port B is connected to the second discharge port R2. Also, when the spool valve 17 is switched to the first position, the supply port P and the second output port B are disconnected from each other, and the first output port A and the first discharge port R1 are disconnected from each other.

There may be a case in which voltage is not applied to the first pilot valve V1, and voltage is applied to the second pilot valve V2. In this case, the second pilot valve V2 supplies compressed fluid, which is pilot fluid, from the fluid supply source to the second pilot pressure chamber 23. The first pilot valve V1 discharges the pilot fluid in the first pilot pressure chamber 21 to the atmosphere. Accordingly, the spool valve 17 moves toward the first piston accommodating recess 20. As a result, the spool valve 17 is switched to the second position, in which the supply port P is connected to the second output port B, and the first output port A is connected to the first discharge port R1. Also, when the spool valve 17 is switched to the second position, the supply port P and the first output port A are disconnected from each other, and the second output port B and the second discharge port R2 are disconnected from each other.

Thus, the first pilot valve V1 supplies pilot fluid to and discharges pilot fluid from the first pilot pressure chamber 21, and the second pilot valve V2 supplies pilot fluid to and discharges pilot fluid from the second pilot pressure chamber 23, so that the spool valve 17 reciprocates in the spool valve hole 16 between the first position and the second position. The connection state among the ports is switched as the spool valve 17 is switched between the first position and the second position. FIG. 1 shows a state in which the spool valve 17 is located at the second position.

<Manifold Base 30>

Each manifold base 30 has the shape of an elongated rectangular block. Each manifold base 30 includes a placement surface 30a. The corresponding electromagnetic valve 11 is placed on the placement surface 30a. The longitudinal direction of the manifold base 30 agrees with the longitudinal direction of the valve casing 12.

The manifold base 30 includes a supply passage 31, a first output passage 32, a second output passage 33, a first discharge passage 34, and a second discharge passage 35. The supply passage 31, the first output passage 32, the second output passage 33, the first discharge passage 34, and the second discharge passage 35 each include a first end portion that opens in the placement surface 30a. The first discharge passage 34 and the second discharge passage 35 are discharge passages of the manifold base 30. The manifold base 30 thus includes two discharge passages.

The first end portion of the supply passage 31 is connected to the supply port P. The first end portion of the first output passage 32 is connected to the first output port A. The first end portion of the second output passage 33 is connected to the second output port B. The first end portion of the first discharge passage 34 is connected to the first discharge port R1. The first end portion of the second discharge passage 35 is connected to the second discharge port R2.

A second end portion of the supply passage 31 is connected to the fluid supply source (not shown), for example, via piping and the like. A second end portion of the first output passage 32 and a second end portion of the second output passage 33 are respectively connected to a fluid pressure device (not shown), for example, via pining and the like.

<First Discharge Passage 34>

Figure 2:
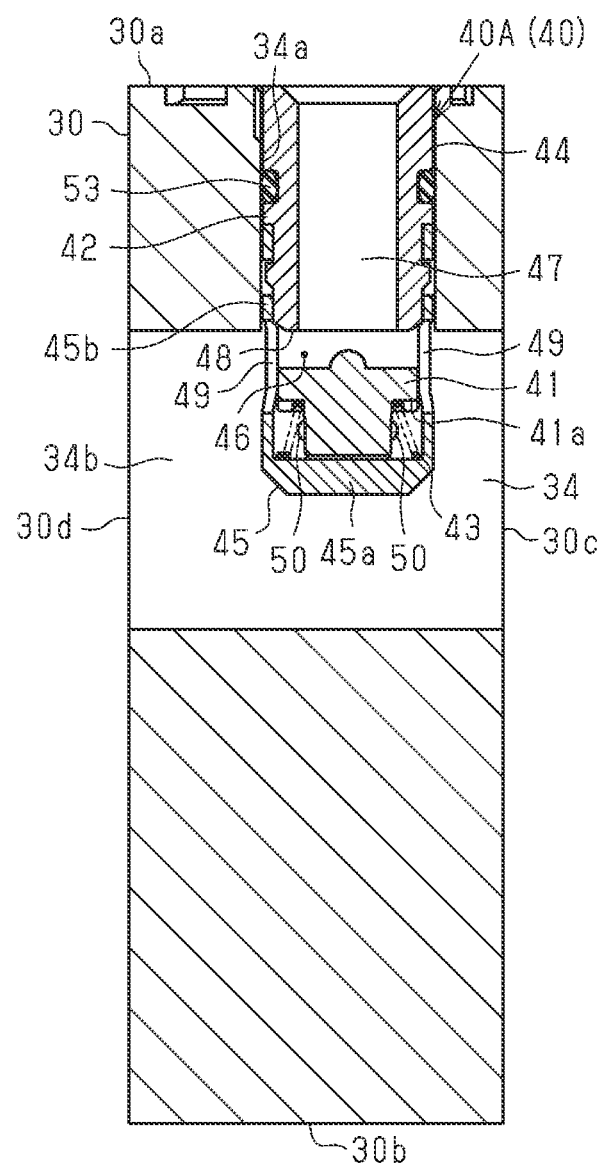
FIG. 2 is a cross-sectional view taken along line 2-2 in FIG. 1.

As shown in FIG. 2, the first discharge passage 34 includes a first passage 34a and a second passage 34b. The first passage 34a extends from the placement surface 30a toward a surface 30b of the manifold base 30 opposite to the placement surface 30a. The first passage 34a includes a first end portion that opens in the placement surface 30a and is connected to the first discharge port R1. The first passage 34a includes a second end portion connected to the second passage 34b. The second passage 34b is thus connected to the second end portion of the first passage 34a.

The second passage 34b extends in a direction orthogonal to the extending direction of the first passage 34a. The second passage 34b thus extends in a direction intersecting with the extending direction of the first passage 34a. The second passage 34b extends in the width direction of the manifold base 30. A first end portion of the second passage 34b opens in a first side surface 30c, which is located on one side in the width direction of the manifold base 30. A second end portion of the second passage 34b opens in a second side surface 30d, which is located on the opposite side in the width direction of the manifold base 30. The second passage 34b thus extends through the manifold base 30 in the width direction. The second passages 34b of the manifold bases 30 that are adjacent to each other in the arrangement direction are connected to each other. Therefore, the second passages 34b of all the manifold bases 30 are connected to each other in the arrangement direction to form a common discharge passage. The second passages 34b are exposed to the atmosphere.

<Second Discharge Passage 35>

Figure 3:
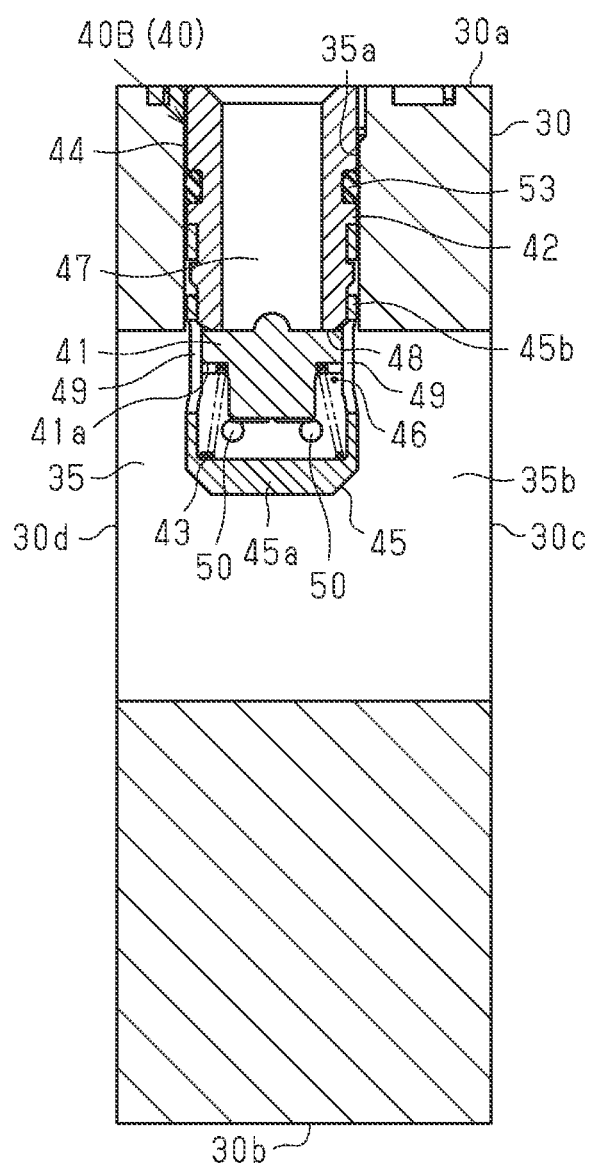
FIG. 3 is a cross-sectional view taken along line 3-3 in FIG. 1.

As shown in FIG. 3, the second discharge passage 35 includes a first passage 35a and a second passage 35b. The first passage 35a extends from the placement surface 30a toward the surface 30b of the manifold base 30 opposite to the placement surface 30a. The first passage 35a includes a first end portion that opens in the placement surface 30a and is connected to the second discharge port R2. The first passage 35a includes a second end portion connected to the second passage 35b. The second passage 35b is thus connected to the second end portion of the first passage 35a.

The second passage 35b extends in a direction orthogonal to the extending direction of the first passage 35a. The second passage 35b thus extends in a direction intersecting with the extending direction of the first passage 35a. The second passage 35b extends in the width direction of the manifold base 30. A first end portion of the second passage 35*b* opens in the first side surface 30*c* of the manifold base 30. A second end portion of the second passage 35*b* opens in the second side surface 30*d* of the manifold base 30. The second passage 35*b* thus extends through the manifold base 30 in the width direction. The second passages 35*b* of the manifold bases 30 that are adjacent to each other in the arrangement direction are connected to each other. Therefore, the second passages 35*b* of all the manifold bases 30 are connected to each other in the arrangement direction to form a common discharge passage. The second passages 35*b* are exposed to the atmosphere.

<Gaskets 36>

As shown in FIG. 1, the electromagnetic valve manifold 10 includes annular gaskets 36. Each gasket 36, for example, has the shape of a thin plate. The gaskets 36 provide a seal between the valve casing 12 of each electromagnetic valve 11 and each manifold base 30.

<Check Valves 40>

The electromagnetic valve manifold 10 includes check valves 40. The check valves 40 are disposed in each of the first discharge passage 34 and the second discharge passage 35. In the following description, the check valve 40 disposed in the first discharge passages 34 may be referred to as a first check valve 40A, and the check valve 40 disposed in the second discharge passage 35 may be referred to as a second check valves 40B. The first check valve 40A allows fluid to flow from the first discharge port R1 to the first discharge passage 34, and prevents fluid from flowing from the first discharge passage 34 to the first discharge port R1. The second check valve 40B allows fluid to flow from the second discharge port R2 to the second discharge passage 35, and prevents fluid from flowing from the second discharge passage 35 to the second discharge port R2. Since the configuration of the first check valve 40A is the same as the configuration of the second check valve 40B, the first check valve 40A and the second check valve 40B may be simply referred to as check valves 40.

Figure 4:
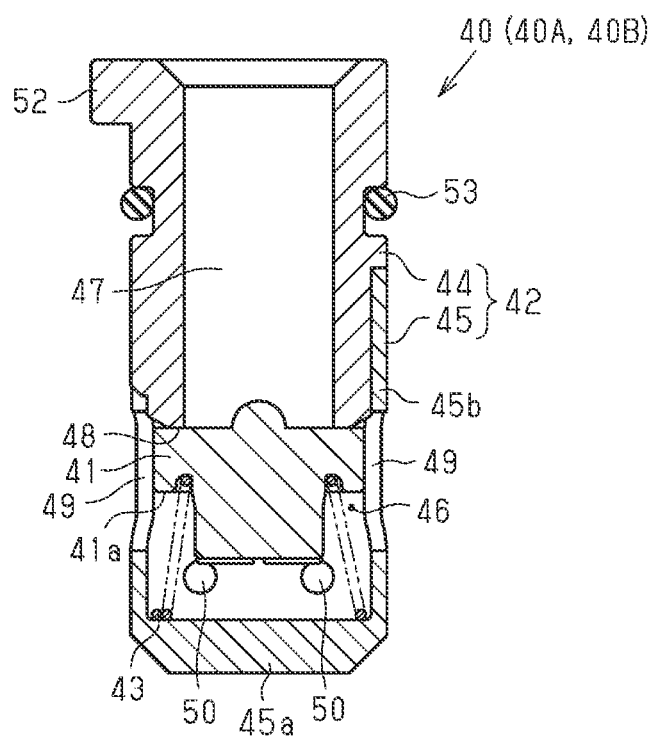
FIG. 4 is a cross-sectional view of a check valve.

As shown in FIG. 4, the check valve 40 includes a valve member 41, a valve housing 42, and an urging member 43. The valve housing 42 is a separate member from the valve body 13 of the electromagnetic valve 11.

<Valve Housing 42>

The valve housing 42 includes a housing body 44 and a housing cover 45. The housing body 44 has a tubular shape. The housing cover 45 includes a plate-shaped end wall 45*a* and a cylindrical peripheral wall 45*b*. The peripheral wall 45*b* extends from the outer periphery of the end wall 45*a*. The housing cover 45 is attached to the housing body 44 by engaging an end portion of the peripheral wall 45*b* opposite to the end wall 45*a* with an outer peripheral surface of the housing body 44.

<Valve Chamber 46>

The valve housing 42 includes a valve chamber 46. The valve chamber 46 is defined by the housing body 44 and the housing cover 45. Specifically, the valve chamber 46 is a space defined by a first end face of the housing body 44 located on one side in the axial direction, and the end wall 45*a* and the peripheral wall 45*b* of the housing cover 45. Therefore, the valve housing 42 includes the cylindrical peripheral wall 45*b*, which defines the valve chamber 46. The valve chamber 46 accommodates the valve member 41. The moving direction of the valve member 41 in the valve chamber 46 agrees with the axial direction of the peripheral wall 45*b*.

<Valve Hole 47>

The housing body 44 includes a valve hole 47. The valve housing 42 thus includes the valve hole 47. The valve hole 47 extends through the housing body 44 in the axial direction. A first end portion of the valve hole 47 opens in a first end face of the housing body 44. Therefore, the valve hole 47 is connected to the valve chamber 46. A second end portion of the valve hole 47 opens in a second end face of the housing body 44, which is located on the opposite side to the housing cover 45.

<Valve Seat 48>

The housing body 44 includes a valve seat 48. The valve housing 42 thus includes the valve seat 48. The valve seat 48 is a first end face of the housing body 44. The valve seat 48 is an annular portion around the opening of the valve hole 47, which opens to the valve chamber 46, and protrudes into the valve chamber 46. The valve seat 48 is thus part of the valve housing 42. The valve member 41 is seated on the valve seat 48. The valve member 41 reciprocates in the axial direction of the peripheral wall 45*b* in the valve chamber 46 to be brought into contact with and separated from the valve seat 48. The valve member 41 includes a back surface 41*a* on the side opposite from the valve seat 48.

<Urging Member 43>

The urging member 43 urges the valve member 41 toward the valve seat 48. The urging member 43 is a spring. The urging member 43 is accommodated in the valve chamber 46. A first end portion of the urging member 43 is supported by an end wall 45*a* of the housing cover 45. A second end portion of the urging member 43 is supported by the back surface 41*a* of the valve member 41.

<Discharge Openings 49>

The housing cover 45 includes one or more discharge openings 49. The valve housing 42 thus includes one or more discharge openings 49. For example, multiple discharge openings 49 are formed in the peripheral wall 45*b*. In the present embodiment, four discharge openings 49 are formed in the peripheral wall 45*b*. The four discharge openings 49 are arranged at equal intervals in the circumferential direction of the peripheral wall 45*b*. Therefore, the four discharge openings 49 are arranged at intervals of 90 degrees in the circumferential direction of the peripheral wall 45*b*. Each discharge opening 49 extends through the peripheral wall 45*b*.

The housing cover 45 is attached to the housing body 44 such that an edge portion of each discharge opening 49 closer to the housing body 44 is continuous with the first end face of the housing body 44. Accordingly, part of each discharge opening 49 overlaps with the valve seat 48 in a direction orthogonal to the moving direction of the valve member 41.

Each discharge opening 49 extends to at least the same position as the valve seat 48 in the moving direction of the valve member 41. Each discharge opening 49 may extend beyond the valve seat 48 to the side away from the valve member 41 in the moving direction of the valve member 41. Each discharge opening 49 may be provided over at least the moving range of the surface of the valve member 41 in contact with the valve seat 48 in the moving direction of the valve member 41. For example, in the fully open state of the valve member 41 as shown in FIG. 2, each discharge opening 49 is provided at least over a range from the position of the valve seat 48 to the position of the surface of the valve member 41 that faces the valve seat 48.

<Breathing Hole 50>

The housing cover 45 includes one or more breathing holes 50. The valve housing 42 thus includes one or more breathing holes 50. For example, the breathing holes 50 are formed in a portion of the peripheral wall 45*b* closer to the end wall 45*a*. Each breathing hole 50 extends through the peripheral wall 45*b*.

<Valve Member 41>

When seated on the valve seat 48, the valve member 41 disconnects the valve hole 47 and the valve chamber 46 from each other. The state in which the valve member 41 is seated on the valve seat 48 is thus a state in which the check valve 40 is closed. When separated from the valve seat 48, the valve member 41 allows the valve hole 47 and the valve chamber 46 to be connected to each other. The state in which the valve member 41 is separated from the valve seat 48 is thus a state in which the check valve 40 is open.

<Leakage Detection Grooves 51>

Figure 5:
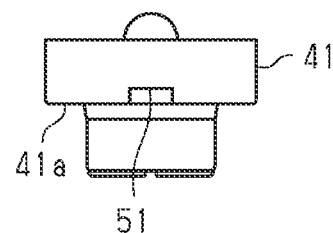
FIG. 5 is a side view of a valve member.
Figure 6:
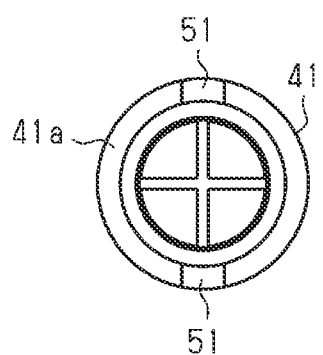
FIG. 6 is a rear view of the valve member.

As shown in FIGS. 5 and 6, the valve member 41 includes one or more leakage detection grooves 51. The leakage detection grooves 51 are formed in part of the back surface 41*a* of the valve member 41 that overlaps with the valve seat 48 in the moving direction of the valve member 41. In the present embodiment, two leakage detection grooves 51 are formed on the back surface 41*a* of the valve member 41.

<Flange Portions 52>

As shown in FIG. 4, the housing body 44 includes one or more flange portions 52. The valve housing 42 thus includes one or more flange portions 52. The flange portions 52 are provided at an end portion of the housing body 44 opposite to the housing cover 45. Each flange portion 52 has the shape of a thin plate and extends from the outer circumferential surface of the housing body 44 in a direction orthogonal to the axial direction of the housing body 44. In the present embodiment, two flange portions 52 protrude from the housing body 44. For illustrative purposes, FIG. 4 shows only one of the two flange portions 52.

<Relationship between First Check Valves 40A and First Discharge Passages 34>

Figure 7:
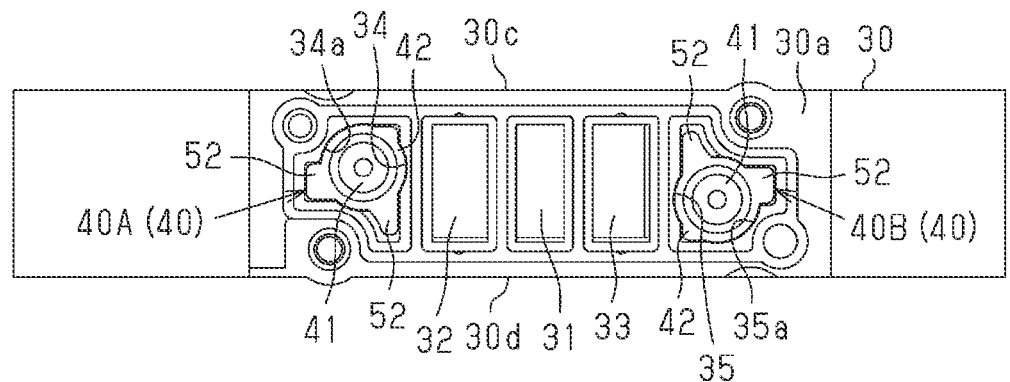
FIG. 7 is a plan view showing a manifold base and a check valve.

As shown in FIGS. 2 and 7, the first check valve 40A is inserted into the first discharge passage 34 in a state in which the axial direction of the peripheral wall 45*b* agrees with the extending direction of the first passage 34*a*. A seal member 53 provides seal between the housing body 44 and the inner wall surface of the first passage 34*a*. As shown in FIG. 2, part of the peripheral wall 45*b* in which the discharge openings 49 are formed protrudes from the first passage 34*a* to the second passage 34*b*. Therefore, the first check valve 40A is disposed in the first discharge passage 34 in a state in which the axial direction of the peripheral wall 45*b* agrees with the extending direction of the first passage 34*a*, and at least the part of the peripheral wall 45*b* in which the discharge openings 49 are formed protrudes from the first passage 34*a* to the second passage 34*b*. Further, two of the four discharge openings 49 are connected to the second passage 34*b* in a state in which the axial direction of these two discharge openings 49 agrees with the extending direction of the second passage 34*b*. Each discharge opening 49 is connected to the second passage 34*b*. Each discharge opening 49 thus connects the valve chamber 46 to the first discharge passage 34. Also, each breathing hole 50 connects the space between the back surface 41*a* of the valve member 41 and the valve housing 42 to the second passage 34*b* of the first discharge passage 34.

As shown in FIG. 7, each flange portion 52 is placed on the placement surface 30*a* around the opening in the first end portion of the first passage 34*a*. When the valve body 13 is attached to the manifold base 30, each flange portion 52 is held between the valve body 13 and the manifold base 30. The flange portions 52 of the first check valve 40A are held between the valve body 13 and the manifold base 30, so that the first check valve 40A is detachably disposed in the first discharge passage 34. The valve hole 47 of the first check valve 40A connects the valve chamber 46 to the first discharge port R1.

<Relationship between Second Check Valves 40B and Second Discharge Passage 35>

As shown in FIGS. 3 and 7, the second check valve 40B is inserted into the second discharge passage 35 in a state in which the axial direction of the peripheral wall 45*b* agrees with the extending direction of the first passage 35*a*. A seal member 53 provides seal between the housing body 44 and the inner wall surface of the first passage 35*a*. As shown in FIG. 3, part of the peripheral wall 45*b* in which the discharge openings 49 are formed protrudes from the first passage 35*a* to the second passage 35*b*. Therefore, the second check valve 40B is disposed in the second discharge passage 35 in a state in which the axial direction of the peripheral wall 45*b* agrees with the extending direction of the first passage 35*a*, and at least the part of the peripheral wall 45*b* in which the discharge openings 49 are formed protrudes from the first passage 35*a* to the second passage 35*b*. Further, two of the four discharge openings 49 are connected to the second passage 35*b* in a state in which the axial direction of these two discharge openings 49 agrees with the extending direction of the second passage 35*b*. Each discharge opening 49 is connected to the second passage 35*b*. Each discharge opening 49 thus connects the valve chamber 46 to the second discharge passage 35. Also, each breathing hole 50 connects the space between the back surface 41*a* of the valve member 41 and the valve housing 42 to the second passage 35*b* of the second discharge passage 35.

As shown in FIG. 7, each flange portion 52 is placed on the placement surface 30*a* around the opening in the first end portion of the first passage 35*a*. When the valve body 13 is attached to the manifold base 30, each flange portion 52 is held between the valve body 13 and the manifold base 30. The flange portions 52 of the second check valve 40B are held between the valve body 13 and the manifold base 30, so that the second check valve 40B is detachably disposed in the second discharge passage 35. The valve hole 47 of the second check valve 40B connects the valve chamber 46 to the second discharge port R2.

Operation of Embodiment

Operation of the present embodiment will now be described.

For example, when the spool valve 17 is at the first position, the fluid supplied to the supply port P flows to the fluid pressure device via the first output port A, and the first output passage 32. Then, the fluid from the fluid pressure device flows toward the second discharge passage 35 via the second output passage 33, the second output port B, and the second discharge port R2.

At this time, the pressure of the fluid flowing from the second discharge port R2 toward the second discharge passage 35 moves the valve member 41 away from the valve seat 48 against the urging force of the urging member 43. As a result, the second check valve 40B is opened. Part of each discharge opening 49 overlaps with the valve seat 48 in a direction orthogonal to the moving direction of the valve member 41. Therefore, when the valve member 41 is separated from the valve seat 48, the fluid that flows out from the second discharge port R2 to the valve chamber 46 via the valve hole 47 does not pass through the clearance between the valve member 41 and the peripheral wall 45*b* before reaching the discharge openings 49. Therefore, the fluid that flows out from the second discharge port R2 to the valve chamber 46 via the valve hole 47 is discharged to the second discharge passage 35 via the discharge openings 49 without passing through the clearance between the valve member 41 and the peripheral wall 45b. Therefore, the fluid is smoothly discharged from the second discharge port R2 to the second discharge passage 35. The fluid discharged to the second discharge passage 35 is discharged to the outside from the second discharge passage 35.

When the valve member 41 of the second check valve 40B is separated from the valve seat 48, the fluid between the back surface 41a of the valve member 41 and the valve housing 42 is discharged to the second discharge passage 35 via the respective breathing holes 50. The breathing holes 50 of the second check valve 40B thus discharge the fluid between the back surface 41a of the valve member 41 and the valve housing 42 to the second discharge passage 35. Accordingly, when the valve member 41 is separated from the valve seat 48, the pressure between the back surface 41a of the valve member 41 and the housing 42 is prevented from increasing. This prevents the valve member 41 from being pushed back toward the valve seat 48 by such pressure increase. As a result, vibration of the valve member 41 when the valve member 41 is separated from the valve seat 48 is limited.

The valve member 41 of the first check valve 40A is seated on the valve seat 48 by the urging force of the urging member 43. The first check valve 40A is thus closed. Therefore, the fluid discharged from another electromagnetic valve 11 and flowing through the second passage 34b is prevented from flowing back to the first discharge port R1. This prevents the electromagnetic valve 11 from malfunctioning.

On the other hand, when the spool valve 17 is switched to the second position as shown in FIG. 1, the fluid supplied to the supply port P is output to the fluid pressure device via the second output port B and the second output passage 33. Then, the fluid from the fluid pressure device flows toward the first discharge passage 34 via the first output passage 32, the first output port A, and the first discharge port R1.

At this time, the pressure of the fluid flowing from the first discharge port R1 toward the first discharge passage 34 moves the valve member 41 away from the valve seat 48 against the urging force of the urging member 43. As a result, the first check valve 40A is opened. Part of each discharge opening 49 overlaps with the valve seat 48 in a direction orthogonal to the moving direction of the valve member 41. Therefore, when the valve member 41 is separated from the valve seat 48, the fluid that flows out from the first discharge port R1 to the valve chamber 46 via the valve hole 47 does not pass through the clearance between the valve member 41 and the peripheral wall 45b before reaching the discharge openings 49. Therefore, the fluid that flows out from the first discharge port R1 to the valve chamber 46 via the valve hole 47 is discharged to the first discharge passage 34 via the discharge openings 49 without passing through the clearance between the valve member 41 and the peripheral wall 45b. Therefore, the fluid is smoothly discharged from the first discharge port R1 to the first discharge passage 34. The fluid discharged to the first discharge passage 34 is discharged to the outside from the first discharge passage 34.

When the valve member 41 of the first check valve 40A is separated from the valve seat 48, the fluid between the back surface 41a of the valve member 41 and the valve housing 42 is discharged to the first discharge passage 34 via the respective breathing holes 50. The breathing holes 50 of the first check valve 40A thus discharge the fluid between the back surface 41a of the valve member 41 and the valve housing 42 to the first discharge passage 34. Accordingly, when the valve member 41 is separated from the valve seat 48, the pressure between the back surface 41a of the valve member 41 and the housing 42 is prevented from increasing. This prevents the valve member 41 from being pushed back toward the valve seat 48 by such pressure increase. As a result, vibration of the valve member 41 when the valve member 41 is separated from the valve seat 48 is limited.

The valve member 41 of the second check valve 40B is seated on the valve seat 48 by the urging force of the urging member 43. The second check valve 40B is thus closed. Therefore, the fluid discharged from another electromagnetic valve 11 and flowing through the second passage 35b is prevented from flowing back to the second discharge port R2. This prevents the electromagnetic valve 11 from malfunctioning.

Figure 8:
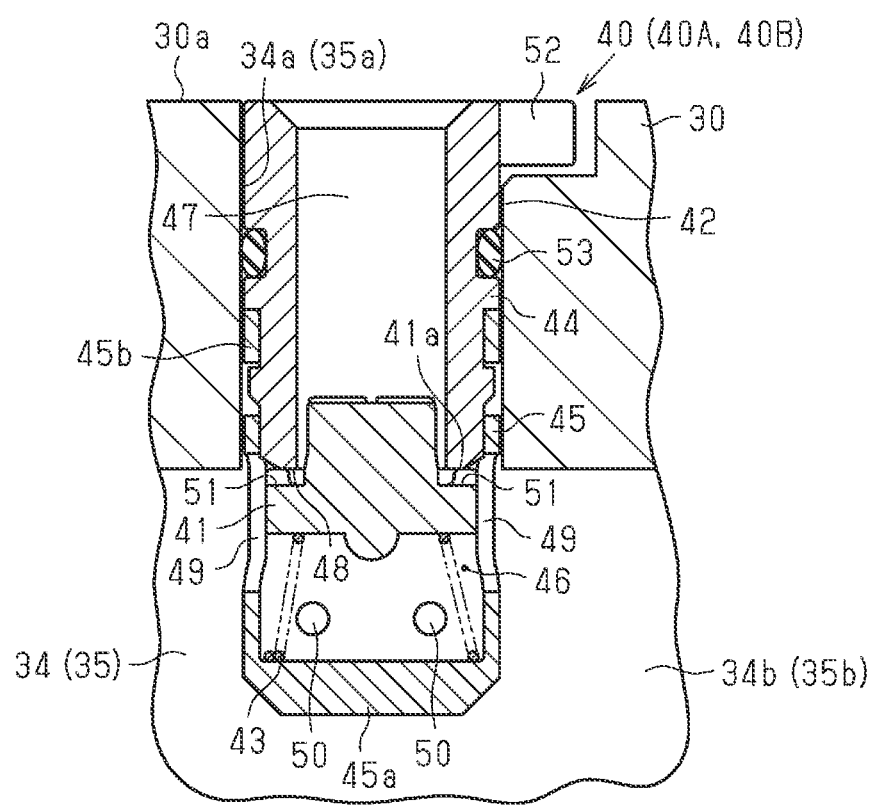
FIG. 8 is a cross-sectional view showing a state in which the valve member is accommodated in a valve chamber such that a back surface of the valve member faces a valve seat.

FIG. 8 illustrates an example in which an operator erroneously accommodates the valve member 41 in the valve chamber 46 such that the back surface 41a of the valve member 41 of the first check valve 40A faces the valve seat 48. In this case, when the valve member 41 is seated on the valve seat 48, the valve hole 47 and the valve chamber 46 are connected to each other via the leakage detection grooves 51. Since the first discharge port R1 and the first discharge passage 34 are always connected to each other, the operator recognizes the erroneous assembly by detecting the leakage of the fluid. The same applies to a case in which the operator erroneously accommodates the valve member 41 in the valve chamber 46 such that the back surface 41a of the valve member 41 of the second check valve 40B faces the valve seat 48, and thus detailed description thereof will be omitted.

Advantages of Embodiment

The above-described embodiment has the following advantages. Since the advantages of the first check valve 40A and the advantages of the second check valve 40B are the same, only the advantages of the first check valve 40A will be described in the following description.

(1) The first check valve 40A is disposed in the first discharge passage 34. Part of each discharge opening 49 overlaps with the valve seat 48 in a direction orthogonal to the moving direction of the valve member 41. With this configuration, when the valve member 41 is separated from the valve seat 48, the fluid that flows out from the first discharge port R1 to the valve chamber 46 via the valve hole 47 does not pass through the clearance between the valve member 41 and the peripheral wall 45b before reaching the discharge openings 49. Therefore, the fluid that flows out from the first discharge port R1 to the valve chamber 46 via the valve hole 47 is discharged to the first discharge passage 34 via the discharge openings 49 without passing through the clearance between the valve member 41 and the peripheral wall 45b. Therefore, the fluid is smoothly discharged from the first discharge port R1 to the first discharge passage 34. This limits the pressure loss of the fluid.

(2) The discharge openings 49 are connected to the second passage 34b in a state in which the axial direction of the discharge openings 49 agrees with the extending direction of the second passage 34b. No wall surface that forms the first discharge passage 34 is present in the area into which fluid is discharged from discharge openings 49. Therefore, the fluid that flows out from the first discharge port R1 to the valve chamber 46 via the valve hole 47 is smoothly discharged to the second passage 34b via the discharge openings 49 without colliding with the wall surface of the first discharge passage 34. This reliably limits the pressure loss of the fluid.

(3) The valve housing 42 includes the breathing holes 50, which discharge the fluid between the back surface 41a of the valve member 41 and the valve housing 42 to the first discharge passage 34. With this configuration, for example, when the valve member 41 is separated from the valve seat 48, the fluid between the back surface 41a of the valve member 41 and the valve housing 42 is discharged to the first discharge passage 34 via the respective breathing holes 50. Accordingly, when the valve member 41 is separated from the valve seat 48, the pressure between the back surface 41a of the valve member 41 and the housing 42 is prevented from increasing. This prevents the valve member 41 from being pushed back toward the valve seat 48 by such pressure increase. As a result, vibration of the valve member 41 when the valve member 41 is separated from the valve seat 48 is limited. This improves the reliability.

(4) The valve housing 42 is a separate member from the valve body 13 of the electromagnetic valve 11. The valve housing 42 includes the flange portions 52 held between the valve body 13 and the manifold base 30. With this configuration, for example, when maintenance of the first check valve 40A is performed, the first check valves 40A can be taken out from the first discharge passage 34 by releasing the flange portions 52 from the valve body 13 and the manifold base 30. Since the valve housing 42 is a separate member from the valve body 13 of the electromagnetic valve 11, for example, even when the first check valve 40A needs to be replaced with a new first check valve 40A, the valve body 13 does not need to be replaced with a new valve body 13. This reduces the costs.

(5) The back surface 41a of the valve member 41 includes the leakage detection grooves 51 in part of the portion overlapping with the valve seat 48 in the moving direction of the valve member 41. For example, if the operator erroneously accommodates the valve member 41 in the valve chamber 46 such that the back surface 41a of the valve member 41 faces the valve seat 48, the valve hole 47 and the valve chamber 46 are connected to each other through the leakage detection grooves 51 when the valve member 41 is seated on the valve seat 48. Since the first discharge port R1 and the first discharge passage 34 are always connected to each other, the operator recognizes the erroneous assembly by detecting the leakage of the fluid.

[Modifications]

The above-described embodiment may be modified as follows. The above-described embodiment and the following modifications can be combined as long as the combined modifications remain technically consistent with each other.

In the above-described embodiment, part of each discharge opening 49 overlaps with the valve seat 48 in a direction orthogonal to the moving direction of the valve member 41. However, the present disclosure is not limited to this. For example, the entire discharge opening 49 may overlap with the valve seat 48 in a direction orthogonal to the moving direction of the valve member 41. In short, the discharge openings 49 may be modified if at least part of each discharge opening 49 overlaps with the valve seat 48 in a direction orthogonal to the moving direction of the valve member 41.

In the above-described embodiment, the axial direction of the discharge openings 49 does not necessarily need to agree with the extending direction of the second passages 34b and 35b.

In the above-described embodiment, the peripheral wall 45b includes four discharge openings 49. However, the number of discharge openings 49 formed in the peripheral wall 45b is not limited to this. For example, the peripheral wall 45b may include six discharge openings 49. Six discharge openings 49 may be arranged at equal intervals in the circumferential direction of the peripheral wall 45b. Thus, the six discharge openings 49 may be arranged at intervals of 60 degrees in the circumferential direction of the peripheral wall 45b.

In the above-described embodiment, the peripheral wall 45b includes multiple breathing holes 50 in a portion close to the end wall 45a. However, the present disclosure is not limited to this. For example, the breathing holes 50 may be formed in the end wall 45a. In short, the breathing holes 50 may be modified if the breathing holes 50 discharge the fluid between the back surface 41a of the valve member 41 and the valve housing 42 to the first discharge passage 34 or the second discharge passage 35.

In the above-described embodiment, the valve housing 42 does not necessarily need to include the breathing holes 50.

In the above-described embodiment, the leakage detection grooves 51 do not necessarily need to be formed in the back surface 41a of the valve member 41.

In the above-described embodiment, the urging member 43 does not necessarily need to be a spring, but may be, for example, an elastic body that can be deformed elastically, such as a rubber member. In short, the urging member 43 may be any member that urges the valve member 41 toward the valve seat 48.

In the above-described embodiment, for example, the valve housing 42 and the valve body 13 of the electromagnetic valve 11 may be formed integrally. In this case, the flange portions 52 are unnecessary.

In the above-described embodiment, the electromagnetic valve 11 is a double-solenoid electromagnetic pilot valve. However, the electromagnetic valve 11 is not limited to this, and may be, for example, a single-solenoid electromagnetic pilot valve, which includes a single pilot valve.

In the above-described embodiment, the electromagnetic valve 11 may be a four-port electromagnetic valve from which, for example, the second discharge port R2 is omitted. That is, any type of electromagnetic valve may be used as the electromagnetic valve 11 as long as the electromagnetic valve 11 includes at least one discharge port. Also, the electromagnetic valve 11 may be a three-port electromagnetic valve that includes a supply port, an output port, and a discharge port.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electromagnetic valve manifold, comprising:
an electromagnetic valve including a discharge port;

a manifold base including a placement surface on which the electromagnetic valve is placed and a discharge passage that is open in the placement surface and is connected to the discharge port; and a check valve that permits fluid to flow from the discharge port to the discharge passage and prevents fluid from flowing from the discharge passage to the discharge port, wherein the check valve includes:
  a valve member;
  a valve housing including a valve seat on which the valve member is seated; and
  an urging member that urges the valve member toward the valve seat, the valve housing includes:
  a valve chamber that accommodates the valve member;
  a peripheral wall that defines the valve chamber;
  a valve hole that connects the valve chamber to the discharge port; and
  a discharge opening that connects the valve chamber to the discharge passage, the valve seat is part of the valve housing and is an annular portion around an opening of the valve hole that opens to the valve chamber, the valve seat protruding into the valve chamber, the valve member is configured to move toward and away from the valve seat by reciprocating in the valve chamber in an axial direction of the peripheral wall, the check valve is disposed in the discharge passage, the discharge opening is formed in the peripheral wall so as to at least partially overlap with the valve seat in a direction orthogonal to a moving direction of the valve member; or extend, in the moving direction of the valve member, over at least a moving range of a surface of the valve member in contact with the valve seat, the discharge passage includes:
  a first passage extending from the placement surface toward a surface of the manifold base opposite to the placement surface, the first passage including a first end portion opening in the placement surface and a second end portion opposite to the first end portion; and
  a second passage connected to the second end portion of the first passage and extending in a direction intersecting with an extending direction of the first passage an axial direction of the peripheral wall agrees with the extending direction of the first passage, at least a portion of the peripheral wall in which the discharge opening is formed protrudes from the first passage to the second passage, and the discharge opening is connected to the second passage in a state in which an axial direction of the discharge opening agrees with an extending direction of the second passage.

2. The electromagnetic valve manifold according to claim 1, wherein the valve member includes a back surface on a side opposite to the valve seat, and the valve housing includes a breathing hole that discharges fluid between the back surface of the valve member and the valve housing to the discharge passage.

3. An electromagnetic valve manifold, comprising:
an electromagnetic valve including a discharge port;
a manifold base including a placement surface on which the electromagnetic valve is placed and a discharge passage that is open in the placement surface and is connected to the discharge port; and
a check valve that permits fluid to flow from the discharge port to the discharge passage and prevents fluid from flowing from the discharge passage to the discharge port, wherein
the check valve includes:
  a valve member;
  a valve housing including a valve seat on which the valve member is seated; and
  an urging member that urges the valve member toward the valve seat,
the valve housing includes:
  a valve chamber that accommodates the valve member;
  a peripheral wall that defines the valve chamber;
  a valve hole that connects the valve chamber to the discharge port; and
  a discharge opening that connects the valve chamber to the discharge passage,
the valve seat is part of the valve housing and is an annular portion around an opening of the valve hole that opens to the valve chamber, the valve seat protruding into the valve chamber,
the valve member is configured to move toward and away from the valve seat by reciprocating in the valve chamber in an axial direction of the peripheral wall,
the check valve is disposed in the discharge passage,
the discharge opening is formed in the peripheral wall so as to at least partially overlap with the valve seat in a direction orthogonal to a moving direction of the valve member; or extend, in the moving direction of the valve member, over at least a moving range of a surface of the valve member in contact with the valve seat,
the valve housing is a separate member from a valve body of the electromagnetic valve, and
the valve housing includes a flange portion held between the valve body and the manifold base.

4. The electromagnetic valve manifold according to claim 3, wherein the valve member includes a back surface on a side opposite to the valve seat, and the valve housing includes a breathing hole that discharges fluid between the back surface of the valve member and the valve housing to the discharge passage.

5. An electromagnetic valve manifold, comprising:
an electromagnetic valve including a discharge port;
a manifold base including a placement surface on which the electromagnetic valve is placed and a discharge passage that is open in the placement surface and is connected to the discharge port; and
a check valve that permits fluid to flow from the discharge port to the discharge passage and prevents fluid from flowing from the discharge passage to the discharge port, wherein
the check valve includes:
  a valve member;
  a valve housing including a valve seat on which the valve member is seated; and
  an urging member that urges the valve member toward the valve seat,
the valve housing includes:
  a valve chamber that accommodates the valve member;
  a peripheral wall that defines the valve chamber;
  a valve hole that connects the valve chamber to the discharge port; and
  a discharge opening that connects the valve chamber to the discharge passage, the valve seat is part of the valve housing and is an annular portion around an opening of the valve hole that opens to the valve chamber, the valve seat protruding into the valve chamber, the valve member is configured to move toward and away from the valve seat by reciprocating in the valve chamber in an axial direction of the peripheral wall, the check valve is disposed in the discharge passage, the discharge opening is formed in the peripheral wall so as to at least partially overlap with the valve seat in a direction orthogonal to a moving direction of the valve member; or extend, in the moving direction of the valve member, over at least a moving range of a surface of the valve member in contact with the valve seat, the valve member includes a back surface on a side opposite to the valve seat, and the back surface includes a leakage detection groove in a part of a portion that overlaps with the valve seat in the moving direction of the valve member.

6. The electromagnetic valve manifold according to claim 5, wherein the valve member includes a back surface on a side opposite to the valve seat, and the valve housing includes a breathing hole that discharges fluid between the back surface of the valve member and the valve housing to the discharge passage.

\* \* \* \* \*